United States Patent
Lee et al.

(10) Patent No.: US 9,134,830 B1
(45) Date of Patent: Sep. 15, 2015

(54) TOUCH SCREEN SCALE

(71) Applicant: Amazon Technologies, Inc., Reno, NV (US)

(72) Inventors: Michael Martin Lee, San Jose, CA (US); Gabriel Isaiah Rowe, Fremont, CA (US)

(73) Assignee: Amazon Technologies, Inc., Reno, NV (US)

( * ) Notice: Subject to any disclaimer, the term of this patent is extended or adjusted under 35 U.S.C. 154(b) by 102 days.

(21) Appl. No.: 13/682,282

(22) Filed: Nov. 20, 2012

(51) Int. Cl.
*G01G 23/46* (2006.01)
*G06F 3/041* (2006.01)

(52) U.S. Cl.
CPC ............... *G06F 3/041* (2013.01); *G01G 23/46* (2013.01)

(58) Field of Classification Search
CPC ......... G06F 19/00; G06F 3/041; G06F 3/044; G01L 1/04; G01L 1/00; G01L 1/14; G01L 1/20; G01G 23/42; G01G 19/413; G01G 19/22; G01G 23/46; G06Q 30/00
USPC ............ 177/1, 2, 25.13, 25.16; 345/173–174, 345/179; 702/41; 705/407
See application file for complete search history.

(56) References Cited

U.S. PATENT DOCUMENTS

| | | | |
|---|---|---|---|
| 2004/0003947 A1* | 1/2004 | Kesselman et al. | 177/25.13 |
| 2012/0072131 A1* | 3/2012 | Ikebe | 702/41 |
| 2012/0181091 A1* | 7/2012 | Lieu | 177/1 |
| 2014/0019070 A1* | 1/2014 | Dietz et al. | 702/41 |
| 2014/0089231 A1* | 3/2014 | Jhunja et al. | 705/407 |
| 2014/0092054 A1* | 4/2014 | Ng | 345/174 |

* cited by examiner

*Primary Examiner* — Nicholas Lee
*Assistant Examiner* — Abdul-Samad A Adediran
(74) *Attorney, Agent, or Firm* — Lowenstein Sandler LLP (57) ABSTRACT

A touch screen on a user device is used to measure the weight of one or more objects on a measurement device that is placed on the touch screen. The measurement device may include a plurality of styluses. The user device receives pressure data indicating the amount of pressure or force caused by the measurement device and one or more objects and calculates a weight based on the pressure data. The pressure data may be received from one or more of the measurement device or from the touch screen.

14 Claims, 8 Drawing Sheets

TOUCH SCREEN SCALE

BACKGROUND

A large and growing population of users enjoys entertainment through the consumption of media items, including electronic media, such as electronic books (also referred to herein as ebooks), electronic newspapers, electronic magazines and other electronic reading material, digital music, and digital video. Users employ various electronic devices to consume such publications. Among these electronic devices (e.g., user devices) are electronic book readers, cellular telephones, personal digital assistants (PDAs), smart phones, portable media players, tablet computers, electronic pads, netbooks, desktop computers, notebook computers and the like.

The electronic devices often include a touch screen that both displays data or information to the user and receives user input from the user. For example, a user may watch a digital video or may view a website using the touch screen. In another example, the user may select an icon or input text using the touch screen. The users may use touch objects (e.g., a finger, a stylus, etc.) to provide the user input to the touch screen.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Systems and methods in accordance with various embodiments of the present disclosure allow the touch screen of a user device to measure or determine the weight of one or more objects that may be placed on a measurement device or a sensing component on top of the touch screen. This allows the touch screen to be used as a digital scale or a touch screen scale. The measurement device or sensing component may include a surface on which one or more objects may be placed, and may include a plurality of styluses attached to the bottom of the surface. The user device may receive pressure data (e.g., data indicating the amount of force or pressure) exerted on the surface of the touch screen by the measurement device (or sensing component) and the one or more objects. The pressure data may be received from the styluses attached to the measurement device or sensing component (e.g., received from a pressure sensor in a stylus). The user device may determine the weight of the one or more objects based on the pressure data. The weight of the one or more objects may be displayed to a user or may be transmitted or sent to an application. For example, a postage application may use the weight to determine a postage for a letter or an envelope. The user device may also determine a location where a portion of the measurement device or sensing component physically contacts the touch screen and may invoke or select different applications based on the location of the contact. For example, the user device may invoke a postage application or a web browser, based on the location of the contact.

Figure 1:
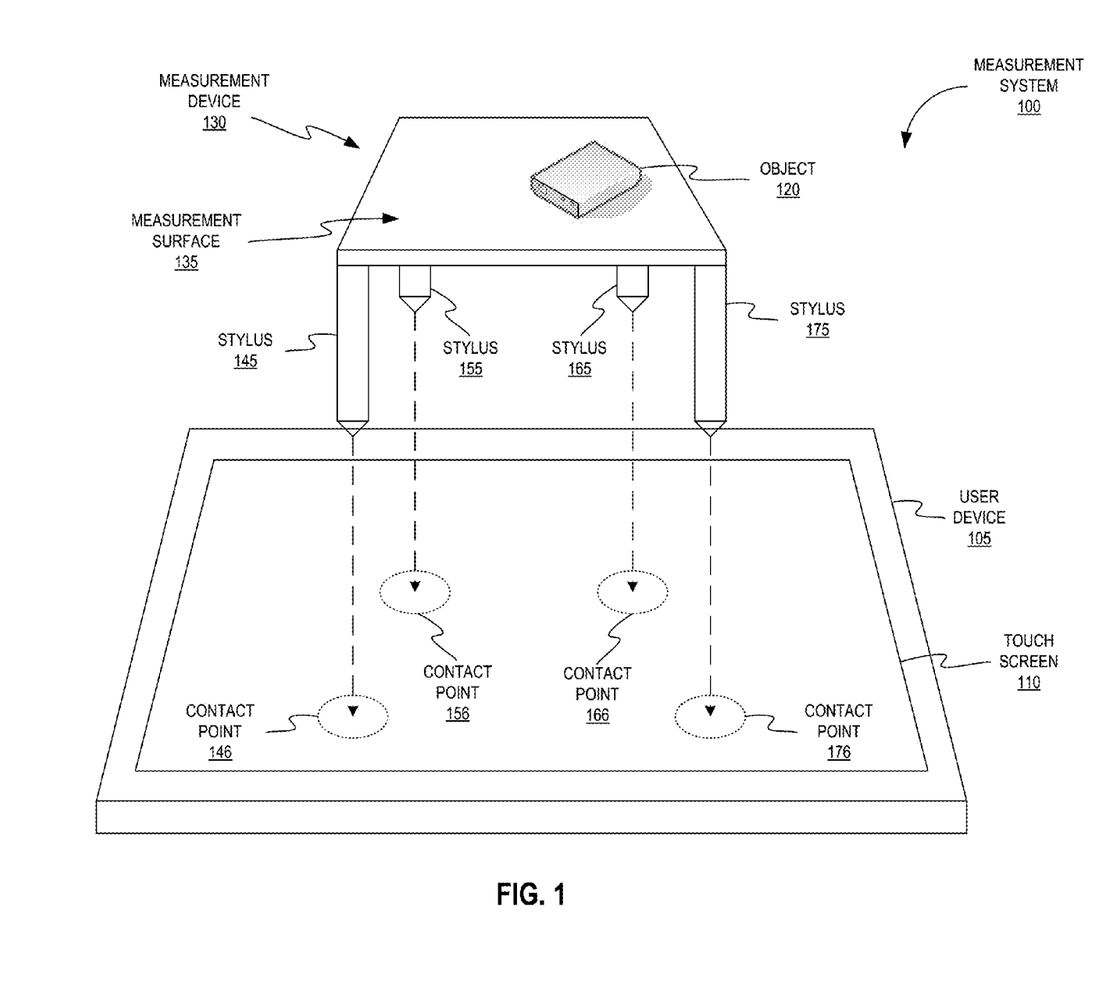
FIG. 1 is a block diagram illustrating a measurement system according to one embodiment.

FIG. 1 is a block diagram illustrating a measurement system 100 according to one embodiment. The measurement system 100 includes a user device 105 and a measurement device 130. The measurement device 130 may also be referred to as a sensing component. In one embodiment, the sensing component may include a portion or part of the measurement device 130 (e.g., one or more of the styluses 145, 155, 165, and 175). In one embodiment, the measurement system 100 may measure the weight the object 120 when the measurement device 130 and the object 120 are placed into physical contact with the user device 105. Although only one object 120 is illustrated in FIG. 1, in other embodiments, the measurement system 100 may measure the weight of a plurality of objects.

In one embodiment, the user device 105 may be any type of computing device such as an electronic book reader, a PDA, a mobile phone, a laptop computer, a tablet computer, a smart phone, a portable media player, a camera, a computing pad, a netbook, a desktop computer, and the like. The user device 105 includes a touch screen 110. The touch screen 110 may be a resistive touch screen, a capacitive touch screen (e.g., a surface capacitance touch screen, a projected capacitance touch screen, a mutual capacitance touch screen, a self-capacitance touch screen), or any component capable of receiving input from a touch object (e.g., a user's finger, a user's finger nail, a stylus, a conductive object, etc.). The touch screen 110 may include intersecting rows and columns of electrodes (e.g., metallic or conductive strips of material), as illustrated below in FIG. 3.

The measurement device 130 includes a measurement surface 135. The measurement surface 135 may provide a surface on which a user may place one or more objects. The measurement system 100 may measure the weight of the one or more objects (e.g., object 120) placed on the measurement surface 135. In other embodiments, the measurement surface 135 may have a different shape, a different thickness, or different dimensions. For example, the measurement surface 135 may be a circular disk. In another example, the measurement surface 135 may be a rectangular or circular bowl.

The measurement device 130 (e.g., sensing component) also includes styluses 145, 155, 165, and 175. The styluses 145, 155, 165, and 175 may each be devices that provide input to the user device 105 via the touch screen 110. In one embodiment, the styluses 145, 155, 165, and 175 may be active styluses (e.g., a stylus that transmits an electrical signal or an electrical current to the touch screen 110). In another embodiment the styluses 145, 155, 165, and 175 may be passive styluses (a stylus that does not transmit an electrical signal or an electrical current).

The styluses 145, 155, 165, and 175 may be physically attached or physically coupled to the measurement surface 135. For example, the body of the stylus 145 may have a cylindrical shape. The bottom of the measurement surface 135 may include a circular hole or opening (not shown in the figures) in which the top portion of the body of the stylus 145 may be inserted. Each of the styluses 145, 155, 165, and 175 may be detached from the measurement surface 135 and may be used as stylus to provide input to the user device 105 via the touch screen 110 (e.g., may be used to write information or draw a picture on the touch screen 110). In one embodiment, the measurement surface 135 and the styluses 145, 155, 165, and 175 may include various notches, ridges, latches, grooves, openings, holes, or other mechanisms that may be used to fasten or attach the styluses 145, 155, 165, and 175 to the measurement surface 135, and that may be used to prevent the styluses 145, 155, 165, and 175 from becoming detached from the measurement surface 135. In one embodiment, the measurement device 130 may include a different number of styluses. For example, measurement device 130 may include three styluses positioned in a triangular shape on the measurement surface 135 (not shown in the figures). In another example, the measurement device 130 may include six styluses (not shown in the figures).

In one embodiment, the measurement device 130 may be a single device or component instead of a device that may be assembled using multiple styluses (as illustrated below in FIG. 4). For example, the measurement device may be a flat, curved, or geometric surface that may have a bottom surface that comes into contact with the touch screen 110 in one or more contact points. The bottom surface may be a flat surface (e.g., the bottom of a box shaped or cup shaped object) or the bottom surface may include ridges, bumps, or other raised shapes that may come into contact with the touch screen 110.

In one embodiment, an object 120 may be positioned over or placed on top of the measurement surface 135. As the measurement device 130 (e.g., sensing component) and the object 120 are placed on the touch screen 110, the styluses 145, 155, 165, and 175 may come into physical contact with the touch screen 110. Stylus 145 may contact the touch screen 110 at contact point 146, stylus 155 may contact the touch screen 110 at contact point 156, stylus 165 may contact the touch screen 110 at contact point 166, and stylus 175 may contact the touch screen 110 at contact point 176. The weight of the measurement device 130 and the object 120 may cause pressure on the contact points 146, 156, 166, and 176 on the touch screen 110. The user device 105 may determine a weight for the object 120 based on the pressure caused by placing the measurement device 130 and the object 120 on the touch screen 110.

The user device 105 may obtain (e.g., receive) pressure data that may be indicative of the pressure caused by placing the measurement device 130 and the object 120 on the touch screen 110. In one embodiment, the user device 105 may receive the pressure data from one or more of the styluses 145, 155, 165, and 175. For example, stylus 155 may include a pressure sensor that may sense or determine the amount of pressure placed on the tip of the stylus 155 (e.g., the amount of pressure caused by the measurement device 130 and the object 120). The stylus 155 may transmit or provide pressure data indicating the amount of pressure placed on the tip of the stylus 155, to the user device 105. The user device 105 may use the pressure data received from one or more of the styluses 145, 155, 165, and 175 to calculate or determine the weight of the object 120.

In one embodiment, the user device 105 may display data indicative of the weight of the object to the user via the touch screen 110. For example, the user device 105 may display the text "6.5 oz." on the touch screen 110 to indicate that the weight of the object 120 is 6.5 ounces. In another embodiment, the user device 105 may provide the data indicative of the weight of the object 120 to an application executing on the user device 105. For example, a postage application for mailing envelopes or packages (e.g., an application from the United States Postal Service (USPS), an application from UPS®, an application from FedEx®, etc.) may be executing on the user device 105. The postage application may calculate postage for an envelope or a package based on the weight of the envelope or package. A user may place the envelope or package on the measurement device 130 and place the measurement device 130 on the touch screen 110. The user device 105 may determine the weight of the envelope or package based on pressure data (received from one or more of the styluses 145, 155, 165, and 175) and may provide data indicative of the weight to the postage application. The postage application may calculate a postage for the envelope or package based on the data indicative of the weight. The postage application may also print out a shipping label and may pay for the postage (e.g., pay using credit card information or account information of the user). The user device 105 may also invoke a web browser that may direct the user to a shipping website and may provide the data indicative of the weight to the shipping website.

In another example, a cooking application or cookbook application may be executing on the user device 105. The cookbook application may include different recipes for different food items. As a user browses or views a recipe, the cookbook application may indicate that a certain amount of an ingredient (e.g., 1 tablespoon or 1 gram of sugar) is used by the recipe. A user may place an amount of the ingredient on the measurement device 130 and place the measurement device on the touch screen 110. The user device 105 may determine the weight of the ingredient based on pressure data (received from one or more of the styluses 145, 155, 165, and 175) and may provide data indicative of the weight to the cookbook application. The cookbook application may determine whether the correct amount of the ingredient is being used.

In a further example, a counting application may be executing on the user device 105. The counting application may allow a user to count the number of objects that are placed on the measurement device 130. For example, a user may weigh a single object and the counting application may determine that the object weights 1 ounce. The user may then place a plurality of the objects (e.g., a plurality of the same object) onto the measurement device 130. The counting application may determine that the plurality of objects weighs 123 ounces. The counting application may determine that there are one-hundred and twenty three objects on the measurement device 130, based on the weight (e.g., 123 objects at 1 ounce each). The counting application may be used in various settings. For example, the counting application may be used in an assembly line (e.g., to count the number of screws or bolts). In another example, the counting application may be used in a pharmacy (e.g., to count the number of pills that should be dispensed to a patient).

In one embodiment, the user device 105 may determine the location of one or more of the contact points 146, 156, 166, and 176. The user device 105 may identify or select an application from a plurality of applications that are on the user device (e.g., that are installed on the user device), based on the location of one or more of the contact points 146, 156, 166, and 176. For example, if contact point 146 is in a top left quadrant of the touch screen 110, the user device 105 may select a postage application and may initiate execution (e.g., invoke) of the postage application. The user device 105 may also provide data indicative of the weight of one or more objects (e.g., object 120) to the selected postage application. In another example, if the contact point 166 is at the bottom right quadrant of the touch screen 110, the user device 105 may select a cookbook application and may initiate execution (e.g., invoke) of the cookbook application. The user device 105 may also provide data indicative of the weight of one or more objects (e.g., object 120) to the selected cookbook application.

Figure 2:
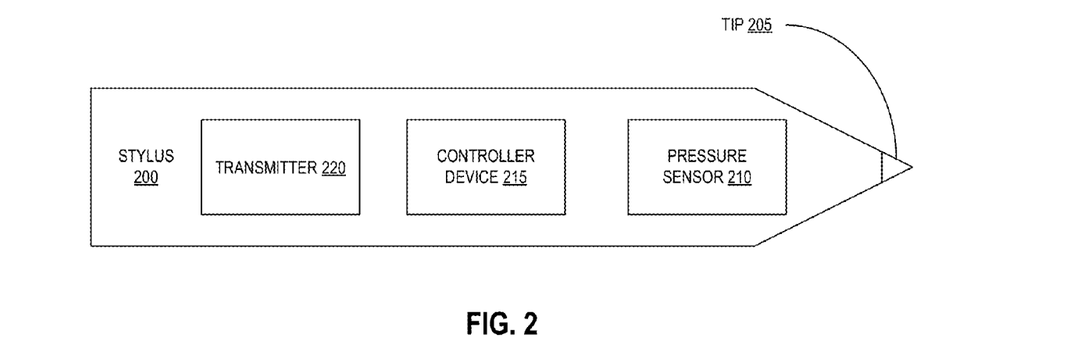
FIG. 2 is a block diagram illustrating a stylus according to one embodiment.

FIG. 2 is a block diagram illustrating a stylus 200 according to one embodiment. The stylus 200 includes a tip 205, a pressure sensor 210, a controller device 215, and a transmitter 220. In one embodiment, the stylus 200 may be an active stylus. The stylus 200 may allow a user to provide input (e.g., user input) to a user device (e.g., user device 105 shown in FIG. 1). For example, the stylus 200 may allow a user to write or draw information onto a touch screen (e.g., touch screen 110 as shown in FIG. 1) of the user device. In another example, the stylus 200 may allow a user to select icons, images, text, or other information.

The tip 205 may come into physical contact with a touch screen (e.g., touch screen 110 as shown in FIG. 1) when the tip 205 is used to provide input to the user device via the touch screen. In one embodiment, the stylus 200 may be an active stylus and the tip 205 may transmit an electrical signal or electrical current to the touch screen. The electrical signal or electrical current may be used to provide user input to the touch screen. In another embodiment, the stylus 200 may be a passive stylus and the tip 205 may not transmit an electrical signal or an electrical current.

In one embodiment, the pressure sensor 210 may measure the amount of pressure (e.g., the amount of force) that is being exerted on the tip 205. For example, the user may hold the stylus 200 as if it were a pen or pencil, and may write on the touch screen using the stylus 200. As the user writes using the stylus 200, the user may press down (e.g., exert pressure or force) on the touch screen using the tip 205 of the stylus 200. In another example, the stylus 200 may be part of a measurement device. As the measurement device is placed on the touch screen, the measurement device (and one or more objects) may exert a pressure or force on the tip 205. In one embodiment, the pressure sensor 210 may provide pressure data (e.g., data indicative of the pressure or force exerted on a touch screen by the stylus 200) to the controller device 215. The pressure data may be any electrical signal, optical signal, magnetic signal, message, information, or any data that may indicate the amount of pressure (e.g., force). The pressure data may be used to calculate or determine the amount of force, exerted on the touch screen by the stylus 200. In one embodiment, the pressure sensor 210 may provide measurement data (e.g., pressure or force measurements) to the controller device. The pressure sensor 210 may be a passive sensor (e.g., force sensing resistor) or an active sensor (e.g., capacitive linear position sensor or a moving element in relation to a coil) within the stylus 200. Alternatively, other methods or components may be used to quantitatively determine and digitize a pressure or force applied to the stylus tip 205 (e.g., other methods to obtain pressure data).

In one embodiment, the controller device 215 may be a processing device that may process the measurement data received from the pressure sensor 210 and may determine or calculate pressure data based on the measurement data. The controller device 215 may periodically request or receive the measurement data from the pressure sensor 210. For example, the controller device 215 may request or receive the measurement data from the pressure sensor 210 every millisecond or every 10 milliseconds. In another example, the controller device 215 may receive the measurement data from the pressure sensor 210 whenever a user exerts pressure on the touch screen using the stylus 200. The controller device 215 may also receive the measurement data from the pressure sensor 210 continuously. The controller device 215 may be a general purpose processing device (e.g., a central processing unit, a processor, etc.) or may be a special-purpose processing device (e.g., an application specific integrated circuit (ASIC), a field programmable gate array (FPGA), a digital signal processor (DSP), etc. The controller device 215 may be implemented using a combination of processing logic, state machines, and other circuitry.

In one embodiment, the transmitter 220 may transmit the pressure data to the user device (e.g., user device 105 as shown in FIG. 1). For example, the transmitter 220 may receive pressure data from the controller device 215 and may transmit the pressure data to the user device. The transmitter 220 may communicate with the user device (e.g., send or receive data) using any type of communication protocol, including but not limited to Bluetooth, ZigBee, Z-Wave, RuBee, 802.15, 802.11, transmission control protocol/internet protocol (TCP/IP), user datagram protocol (UDP), any wireless communication protocol (e.g., long term evolution (LTE), high speed packet access (HSPA)), etc. The transmitter 220 may also include one or more antennae which may be used to communicate with the user device (e.g., may be used to radiate electromagnetic energy or receive electromagnetic energy. In one embodiment (not shown in the figures), the stylus 200 may include a physical wire, cable, or other connection, to the user device and the stylus 200 may communicate pressure data to the user device using the physical connection. For example, the stylus 200 may be a tethered stylus.

Figure 3:
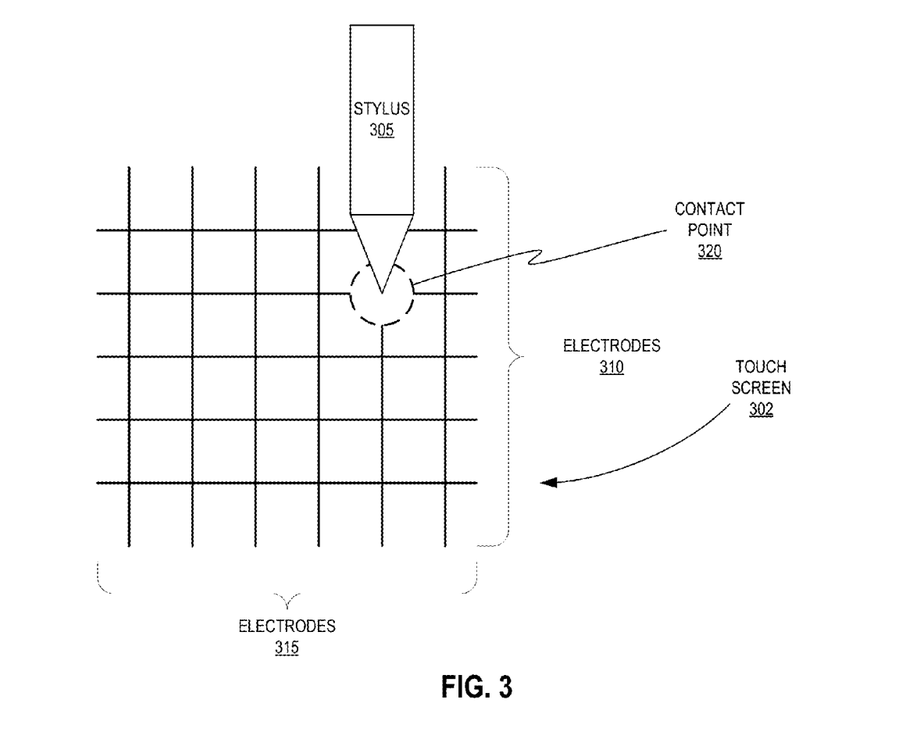
FIG. 3 is a block diagram illustrating a touch screen and a stylus, according to one embodiment.

FIG. 3 is a block diagram illustrating a touch screen 302 and a stylus 305, according to one embodiment. The stylus 305 may be an active stylus (e.g., a stylus that may transmit an electrical signal or an electrical current) or a passive stylus (e.g., a stylus that does not transmit an electrical signal or an electrical current). The touch screen 302 may be a resistive touch screen, a capacitive touch screen (e.g., a surface capacitance touch screen, a projected capacitance touch screen, a mutual capacitance touch screen, a self-capacitance touch screen, etc.), or any other device capable of receiving or processing touch input (e.g., input provided from a stylus, a finger, a conductive object, etc.). The touch screen 302 includes electrodes 310 and electrodes 315. The electrodes 310 are horizontal electrodes and the electrodes 315 are vertical electrodes. In one embodiment, the electrodes 310 may transmit electrical signals or currents and the electrodes 315 may receive the electrical signals or currents. In another embodiment, the electrodes 315 may transmit electrical signals or currents and the electrodes 310 may receive the electrical signals or currents. It should be noted that electrodes 310 and 315 may also be referred to as TX or RX lines.

The electrodes 310 and 315 may form a grid or an array of electrodes that may be used to detect the presence of a touch object (such as stylus 305) on or near the touch screen 302. For example, the touch screen 302 may measure the capacitance at the intersections between the electrodes 310 and 315 (e.g., may obtain a capacitance measurement). As a touch object is placed near or on the touch screen 302, the capacitance between the electrodes 310 and 315 at one or more of the intersections may change (e.g., the capacitance may increase or decrease). As shown in FIG. 3, the stylus 305 may contact the touch screen 302 at contact point 320. Contact point 320 is an intersection between one electrode from the electrodes 310, and another electrode from the electrodes 315. When the stylus 305 comes into physical contact with the touch screen 302 at contact point 320, the capacitance between the electrodes at contact point 320 (e.g., at the intersection of electrodes) stylus 305 may cause a change in capacitance affecting the electrodes 310 and 315. Therefore, by determining the capacitances associated with the intersection of electrodes 310 and 315 (e.g., by performing or obtaining capacitance measurements), the locations of one or more contact points 320 may be determined.

In one embodiment, the stylus 305 may not directly contact the electrodes 310 and 315 in the touch screen 302. The stylus 305 may contact a substrate above the touch screen 302 or may contact a substrate on which the touch screen 302 is deposited. In one embodiment, the substrate may be a dielectric material.

Figure 4:
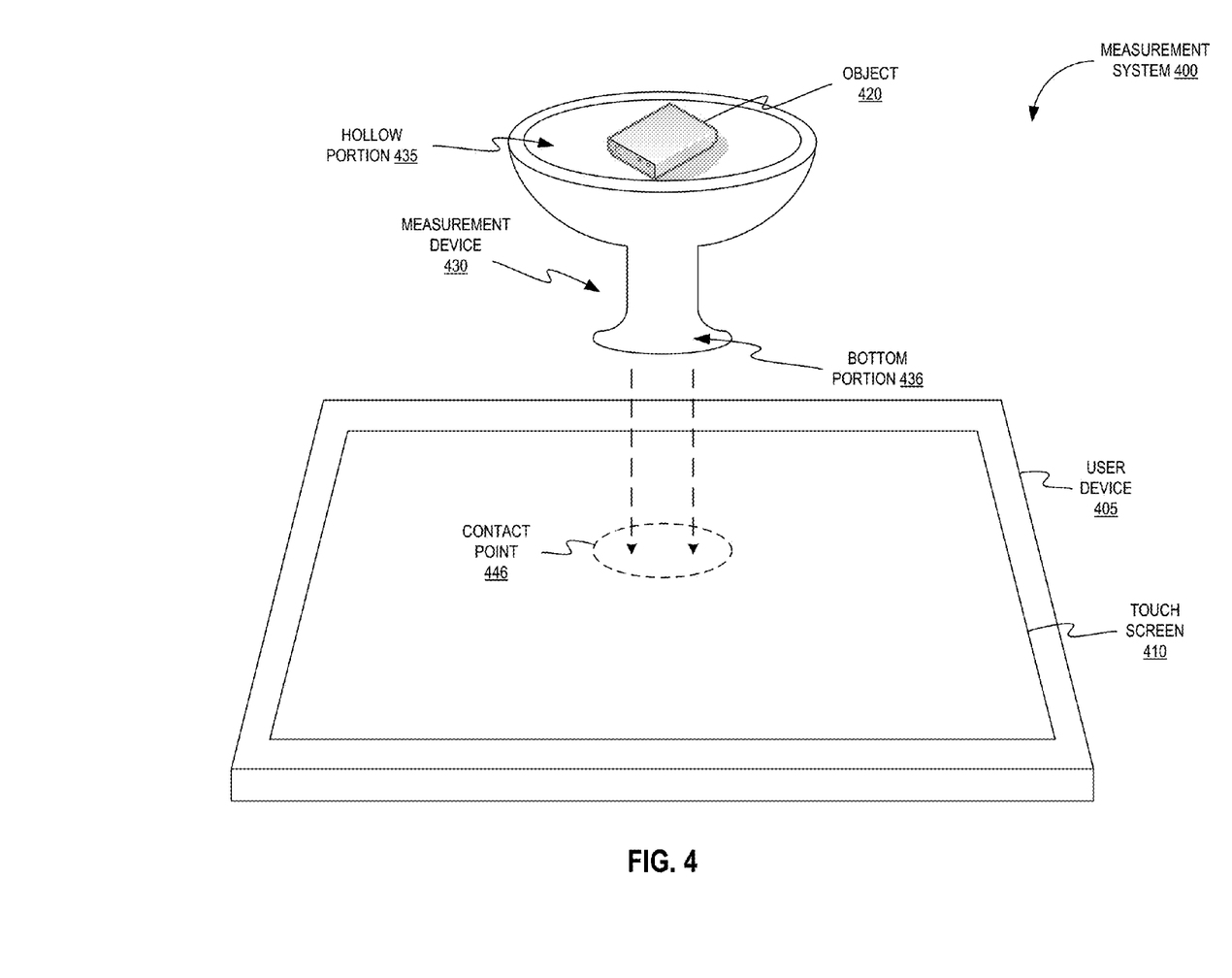
FIG. 4 is a block diagram illustrating a measurement system according to another embodiment.

FIG. 4 is a block diagram illustrating a measurement system, 400 according to another embodiment. The measurement system 400 includes a user device 405 and a measurement device 430 (e.g., a sensing component). In one embodiment, the measurement system 400 may measure the weight the object 420 when the measurement device 430 and the object 420 are placed into physical contact with the user device 405. Although only one object 420 is illustrated in FIG. 4, in other embodiments, the measurement system 400 may measure the weight of a plurality of objects. The user device 405 includes a touch screen 410. The touch screen 410 may be a resistive touch screen, a capacitive touch screen, or any component capable of receiving input from a touch object.

The measurement device 430 may be a single device or component, rather than a device that includes multiple other components (such as multiple styluses, as shown in FIG. 1). The measurement device 430 includes a hollow portion 435. The hollow portion 435 may provide a user with a location to place one or more objects (such as the object 420). The object 420 may be place within the hollow portion 435. As the measurement device 430 and the object 420 are placed on the touch screen 410, bottom portion 436 of the measurement device 430 may come into physical contact with the touch screen 410 at contact point 446. The weight of the measurement device 430 and the object 420 may cause pressure on bottom portion 436. The user device 405 may determine a weight for the object 420 based on the pressure caused by placing the measurement device 430 and the object 420 on the touch screen 410.

The user device 405 may obtain (e.g., receive) pressure data that may be indicative of the pressure caused by placing the measurement device 430 and the object 420 on the touch screen 410. In one embodiment, the user device 405 may receive the pressure data from the measurement device 430. For example, measurement device 430 may include a pressure sensor (not shown in the figure) that may sense or determine the amount of pressure placed on the bottom portion 436 (e.g., the amount of pressure caused by the measurement device 430 and the object 420). The measurement device 430 may transmit or provide pressure data indicating the amount of pressure placed on the bottom portion 436, to the user device 405. The user device 405 may use the pressure data received from the measurement device 430 to calculate or determine the weight of the object 420.

In one embodiment, the user device 405 may display data indicative of the weight of the object to the user via the touch screen 410 (e.g., may display the text "1.4 oz."). In another embodiment, the user device 405 may provide the data indicative of the weight of the object 420 to an application on the user device 405 (e.g., a postage application, a cookbook application, a counting application, etc.). In another embodiment, the user device 405 may determine the location of one or more of the contact point 446. The user device 405 may identify or select an application from a plurality of applications that are on the user device (e.g., that are installed on the user device), based on the location of the contact point 446.

Figure 5:
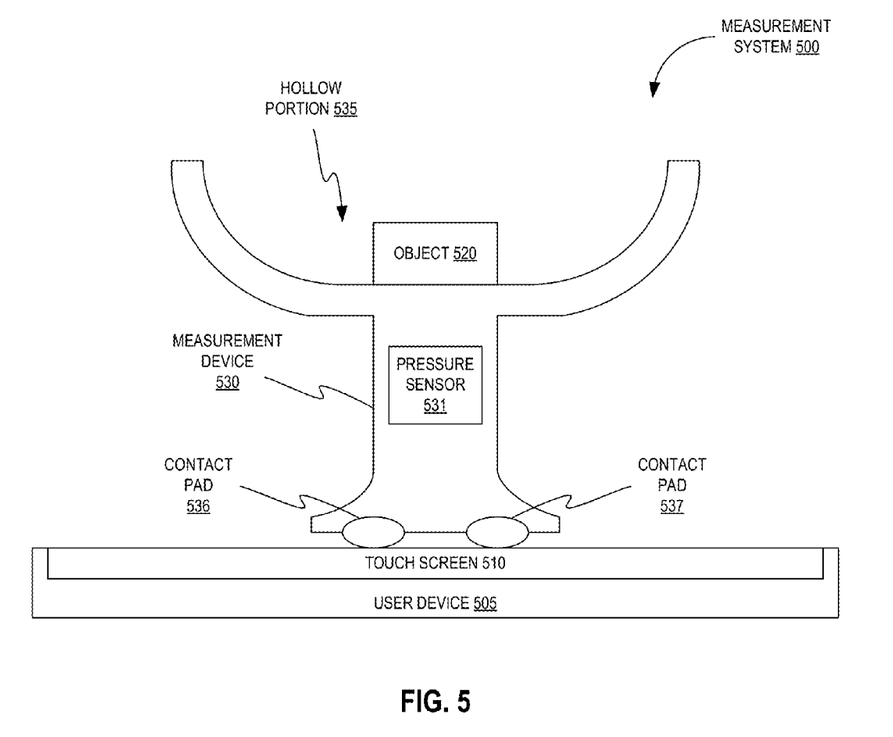
FIG. 5 is a block diagram illustrating a cross sectional view of a measurement system according to a further embodiment.

FIG. 5 is a block diagram illustrating a cross-sectional view of a measurement system, 500 according to another embodiment. The measurement system 500 includes a user device 505 and a measurement device 530. In one embodiment, the measurement system 500 may measure the weight the object 520 when the measurement device 530 and the object 520 are placed into physical contact with the user device 505. Although only one object 520 is illustrated in FIG. 5, in other embodiments, the measurement system 500 may measure the weight of a plurality of objects. The user device 505 includes a touch screen 510. The touch screen 510 may be a resistive touch screen, a capacitive touch screen, or any component capable of receiving input from a touch object.

The measurement device 530 includes a hollow portion 535. The hollow portion 435 may provide a user with a location to place one or more objects (such as the object 520). The object 520 may be place within the hollow portion 535. As the measurement device 530 and the object 520 are placed on the touch screen 510, contact pads 536 and 537 of the measurement device 530 may come into physical contact with the touch screen 510. The weight of the measurement device 530 and the object 520 may cause pressure on contact pads 536 and 537. The user device 505 may determine a weight for the object 520 based on the pressure caused by placing the measurement device 530 and the object 520 on the touch screen 510. The measurement device 530 also includes a pressure sensor 531. The pressure sensor 531 may measure provide pressure data (e.g., data indicative of an amount of pressure) to the user device 505. The pressure sensor 210 may be a passive sensor (e.g., force sensing resistor) or an active sensor (e.g., capacitive linear position sensor or a moving element in relation to a coil). Alternatively, other methods or components may be used to quantitatively determine and digitize a pressure or force applied to the contact pads 536 and 537 (e.g., other methods to obtain pressure data).

The user device 505 may obtain (e.g., receive) pressure data that may be indicative of the pressure caused by placing the measurement device 530 and the object 520 on the touch screen 510. In one embodiment, the user device 505 may receive the pressure data from the measurement device 530. The measurement device 530 may transmit or provide pressure data indicating the amount of pressure placed on the contact pads 536 and 537, to the user device 505. The user device 505 may use the pressure data received from the measurement device 530 to calculate or determine the weight of the object 520.

In one embodiment, the user device 505 may display data indicative of the weight of the object to the user via the touch screen 510 (e.g., may display the text "1.4 oz."). In another embodiment, the user device 505 may provide the data indicative of the weight of the object 520 to an application on the user device 505 (e.g., a postage application, a cookbook application, etc.). In another embodiment, the user device 505 may determine the location of where one or more of the contact pads 536 and 537 come into physical contact with the touch screen 510. The user device 505 may identify or select an application from a plurality of applications that are on the user device (e.g., that are installed on the user device), based on the location on the touch screen 210 where one or more of the contact pads 536 and 537 comes into physical contact with the touch screen 510.

In one embodiment, the measurement device 530 may include multiple contact pads that are arranged in a shape or pattern. For example, the measurement device may include contact pads that are arranged in a circular pattern, a square pattern, a rectangular pattern, a triangular pattern, etc. The contact pads may be conductive objects. The user device 505 may determine the shape, pattern, or layout of the contact pads when the contact pads come into contact with the touch screen 510, because the contact pads are conductive objects. Based on the shape, pattern, or layout of the contact pads, the user device 505 may identify an application and initiate execution of the application or switch to the application. For example, if the user device 505 determines that the contact pads of the measurement device 530 form a circular shape, the user device 505 may identify a cookbook application and may initiate execution of the cookbook application. In another example, if the user device 505 determines that the contact pads of the measurement device form a rectangular shape, the user device 505 may identify a postage application and switch to the postage application.

Figure 6:
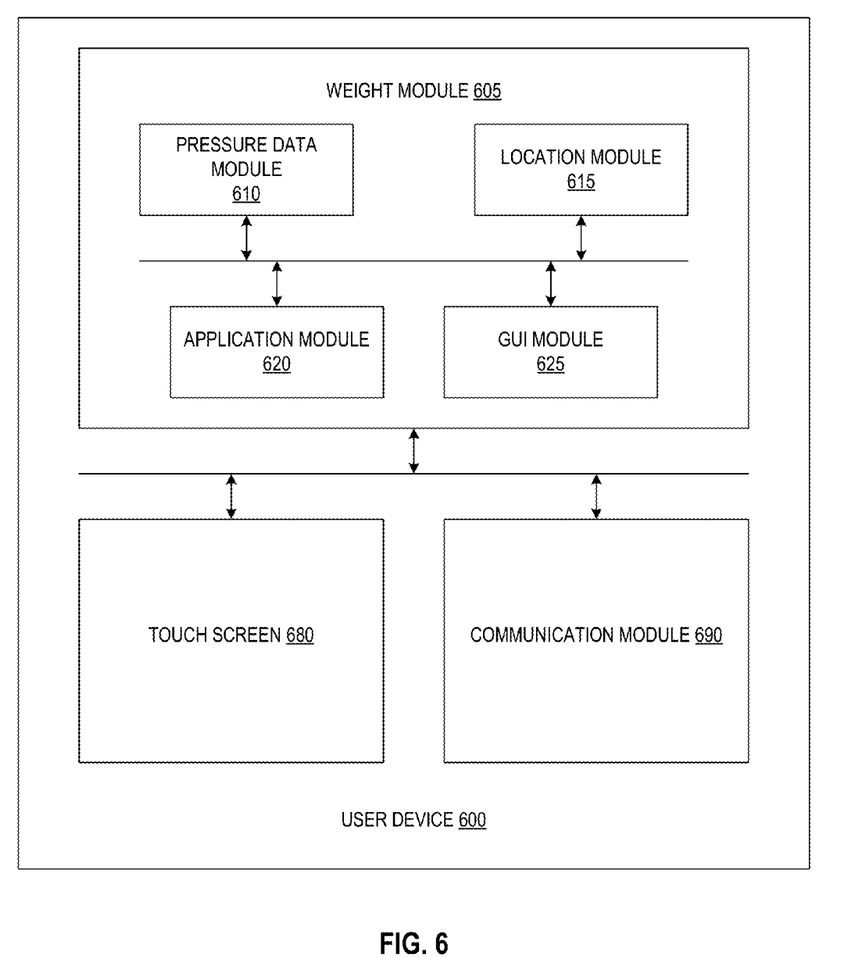
FIG. 6 is a block diagram illustrating a user device, according to one embodiment.

FIG. 6 is a block diagram illustrating a user device 600, according to one embodiment. The user device 600 includes a weight module 605, a touch screen 680, and a communication module 690. More or less components may be included in the user device 600 without loss of generality. For example, two of the modules may be combined into a single module, or one of the modules may be divided into two or more modules. In one embodiment, one or more of the modules may reside on different computing devices (e.g., different user devices).

The touch screen 680 may be a resistive touch screen, a capacitive touch screen (e.g., mutual capacitance touch screen, a self-capacitance touch screen, etc.), or any component capable of receiving input from a touch object (e.g., a finger, a stylus, etc.). In one embodiment, the touch screen 680 may include intersecting rows and columns of electrodes, as illustrated in FIG. 3. The communication module 690 may communicate data with other devices or components. For example, the communication module 690 may communicate data with a stylus (e.g., may receive pressure data from one or more styluses) or a measurement device. In one embodiment, the communication module 690 may include one or more antennae.

The weight module 605 may determine the weight of one or more objects that are placed on a measurement device (e.g., measurement device 130) on top of the touch screen 680. The weight module 605 includes a pressure data module 610, a location module 615, an application module 620, and a GUI module 625.

In one embodiment, the pressure data module 610 may process the pressure data received from a measurement device (e.g., measurement device 130 as shown in FIG. 1) via the communication module 690. For example, the pressure data module 610 may process the pressure data received from one or more styluses in the measurement device. As discussed above, each of the one or more styluses may include a pressure sensor that may sense or determine the amount of pressure placed on a tip of a stylus and each stylus may transmit pressure data indicative of the amount of pressured placed on a touch screen by the tip of the stylus. The pressure data module 610 may process the pressure data to determine the weight of one or more objects placed on the measurement device. In another embodiment, the pressure data module 610 may receive pressure data from a measurement device (e.g., measurement device 430 as shown in FIG. 4). The pressure data module 610 may process the pressure data and may determine the weight of one or more objects placed on the measurement device.

In one embodiment, the location module 615 may determine a location on the touch screen 680 where at least a portion of the measurement device (e.g., a location where a stylus in the measurement device) comes into physical contact with the touch screen 680. As discussed above, the touch screen 680 may include intersecting rows and columns of electrodes. The touch screen 680 may perform capacitance measurements (as described above in FIG. 3) at the intersections of the rows and columns of electrodes and may determine the location of the physical contact based on the capacitance measurements.

In one embodiment, the application module 620 may identify an application based on the location of the physical contact between the at least a portion of the measurement device and the touch screen 680, detected by the location module 615. For example, if the portion of the measurement device is in physical contact with the top left portion of the touch screen 680, the application module 620 may identify a postage application (e.g., an application that may calculate or determine a postage for mailing or shipping an object) from a plurality of applications on the user device 600 (e.g., other applications that are installed on the user device 600). In another example, the application module 20 may identify a cooking application (e.g., an application that may display a cooking recipe and may determine the weight or amount of an ingredient for the recipe) if the portion of the measurement device is in physical contact with the lower portion (e.g., lower half) of the touch screen 680.

In one embodiment, the GUI module 625 may display a graphical user interface that indicates the weight of one or more objects placed on the measurement device. For example, the GUI module 625 may display text, images, numbers, etc., in a window or a box on the touch screen 680. The text, images, numbers, etc., may indicate the weight of one or more objects placed on the measurement device (e.g., 10 ounces, 0.75 pounds, etc.).

Figure 7:
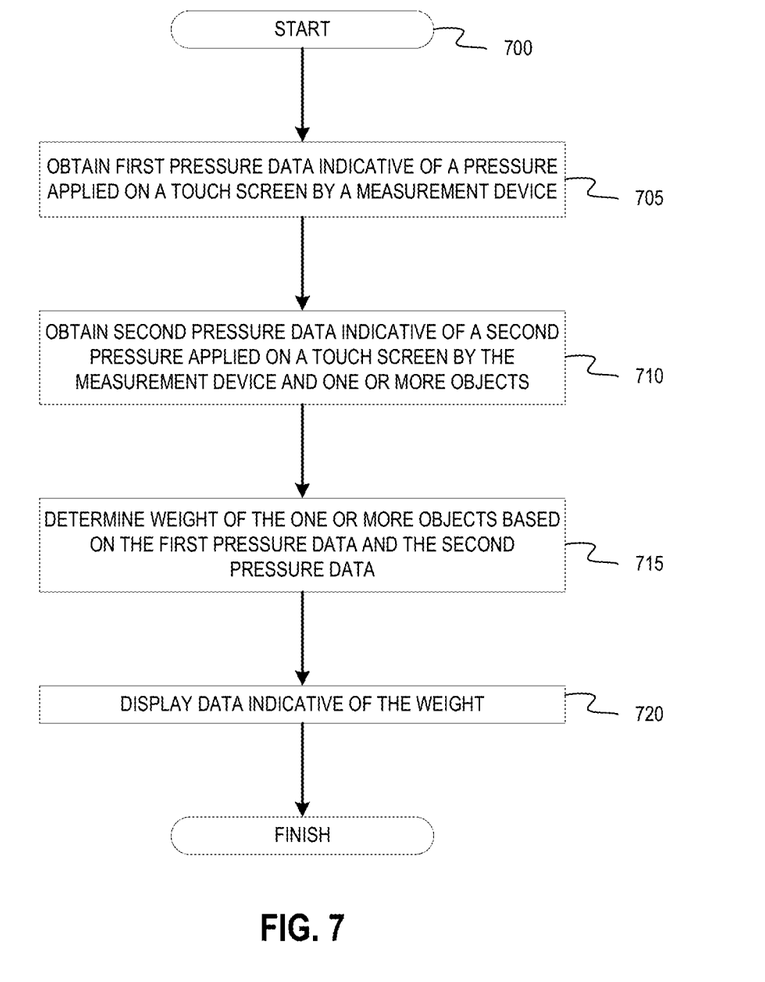
FIG. 7 is a flow diagram illustrating a method of determining a weight for one or more objects, according to one embodiment.
Figure 8:
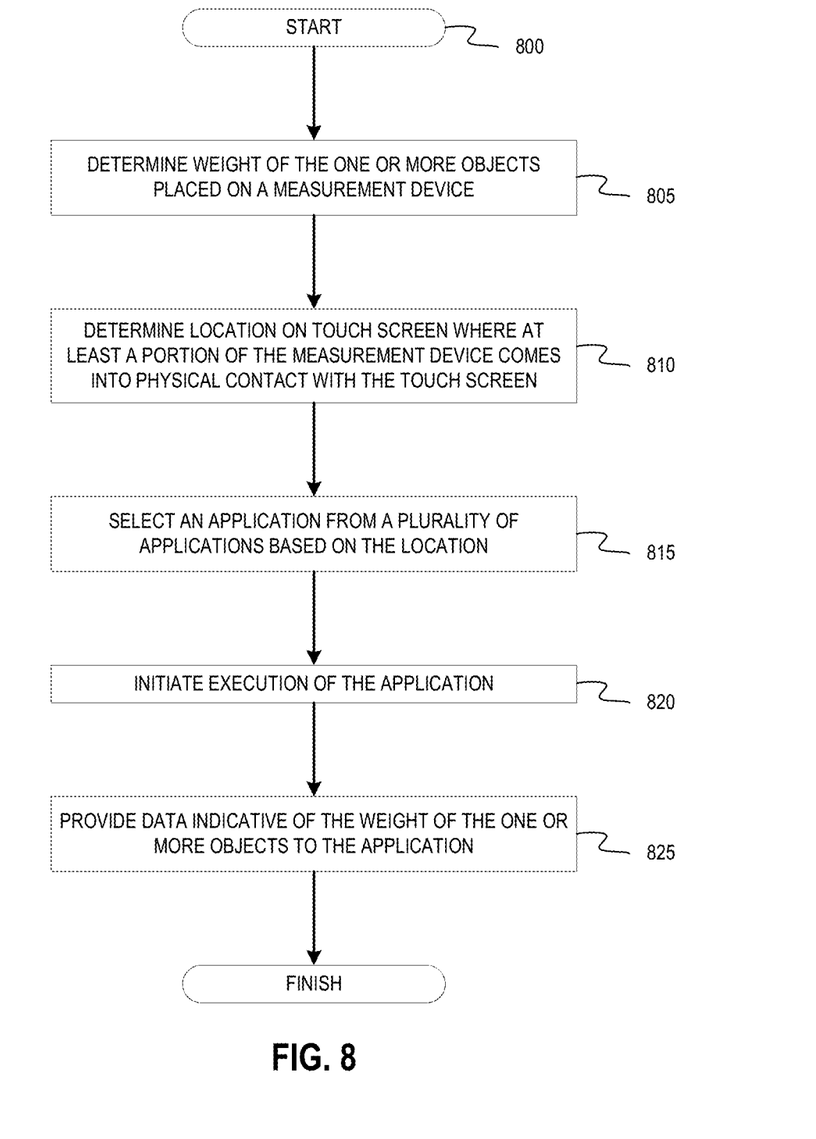
FIG. 8 is a flow diagram illustrating a method of determining a weight for one or more objects, according to another embodiment.

FIGS. 7-8 are flow diagrams illustrating methods for determining a weight of one or more objects. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 7 is a flow diagram illustrating a method 700 of determining a weight for one or more objects, according to one embodiment. The method 700 may use the touch screen of a user device as a scale (e.g., a touch screen scale) to determine, calculate, or measure the weight of one or more objects. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by a weight module, as shown in FIG. 6.

Referring to FIG. 7, the method 700 begins at block 705 where the method 700 obtains a first pressure data indicative of a pressure or force applied on a touch screen by a measurement device (e.g., measure device 130 of FIG. 1). The first pressure data may allow the method 700 to determine the weight of the measurement device. Because the measurement device itself (without objects placed on the measurement device) will also exert a pressure or force on the touch screen when the measurement device is placed on the touch screen, the method 700 may use the first pressure data to "zero out" or calibrate the measurement system. For example, the method 700 may use the first pressure data to determine or calculate the weight of the measurement device itself (without objects placed on the measurement device).

At block 710, the method 700 obtains a second pressure data indicative of a second pressure applied on the touch screen by the measurement device and one or more objects (e.g., object 120 illustrated in FIG. 1) placed on the measurement device. At block 715, the method 700 determines the weight of the one or more objects based on the first pressure data and the second pressure data. For example, the method 700 may subtract the pressure (e.g., the weight) of the measurement device alone, from the pressure (e.g., the weight) of the measurement device and the one or more objects, to obtain the weight of the one or more objects (e.g., may subtract the first pressure data from the second pressure data). At block 720, the method 700 displays data indicative of the weight. For example, the method 700 may display the text "12 ounces" on the touch screen of the user device. After block 720, the method 700 ends.

FIG. 8 is a flow diagram illustrating a method 800 of determining a weight for one or more objects, according to one embodiment. The method 800 may use the touch screen of a user device as a scale (e.g., a touch screen scale) to determine, calculate, or measure the weight of one or more objects. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by a weight module, as shown in FIG. 6.

Referring to FIG. 8, the method 800 begins at block 805 where the method 800 determines the weight one or more objects placed on a measurement device. For example, referring back to FIG. 1, the method 800 may determine the weight of the object 120 placed on the measurement device 130. At block 810, the method 800 may determine the location where at least a portion of the measurement device comes into physical contact with the touch screen. For example, referring back to FIG. 1, the method 800 may determine the location of one or more of the contact points 146, 156, 166, and 176. The method 800 may select an application from a plurality of applications (that may be installed on the user device) based on the location (block 815). For example, referring to FIG. 1, the method 800 may select a postage application based on the location of contact points 146 and 156. The method 800 may initiate execution of the selected application at block 820 (e.g., may invoke the selected application). In one embodiment, block 820 may be optional because the selected application may already be executing (e.g., may already be running) on the user device.

At block 825, the method 800 provides data indicative of the weight of the one or more objects (e.g., "16 ounces) to the application. For example, method 800 may provide data indicative of the weight of an envelope (e.g., 2 ounces) to a postage application and the postage application may calculate a postage for the envelope (e.g., a cost for mailing the envelope) based on the data indicative of the weight. In another example, the method 800 may provide data indicative of the weight of an ingredient (e.g., sugar) to a cookbook application and the cookbook application may indicate whether the right amount (e.g., the right weight) of the ingredient is being used. After block 825, the method 800 ends.

Figure 9:
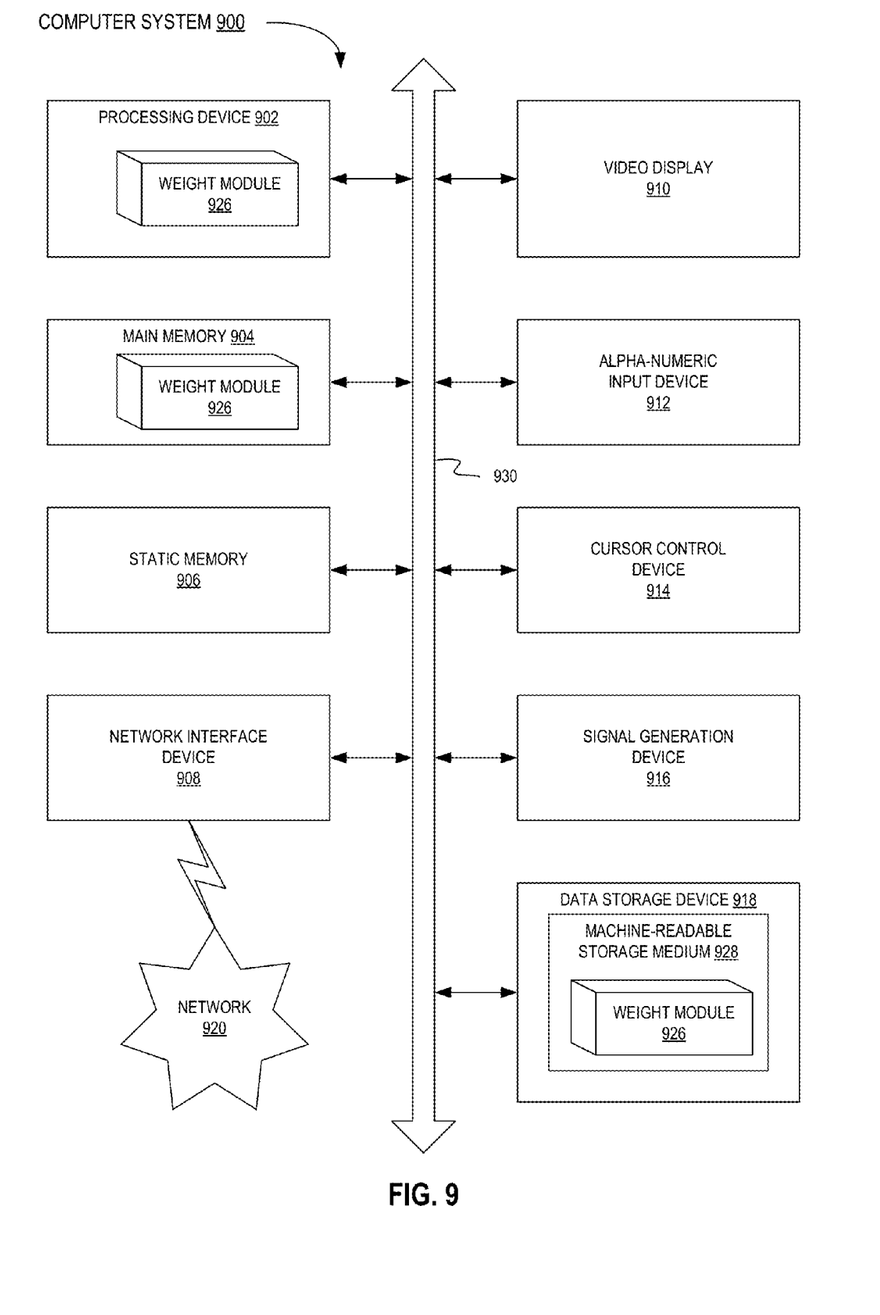
FIG. 9 is a block diagram of a machine in the example form of a computer system, in accordance with one embodiment.

FIG. 9 illustrates a diagrammatic representation of a machine in the example form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute weight module 926 for performing the operations and steps discussed herein.

The computer system 900 may further include a network interface device 908 which may communicate with a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one embodiment, one or more of the video display unit 910, the alphanumeric input device 912, and the cursor control device 914 may be combined into a single component or device (e.g., a touch screen) that may provide or display data, and may receive user input.

The data storage device 918 may include a computer-readable medium 928 on which is stored one or more sets of instructions (e.g., instructions of weight module 926) embodying any one or more of the methodologies or functions described herein. The weight module 926 may also reside, completely or at least partially, within the main memory 904 and/or within the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database and/or associated caches and servers)

that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "determining," "displaying," "initiating," "sending," "determining," "selecting," "invoking," "subtracting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   detecting, by a device, a presence of a measurement device in contact with a touch screen surface, wherein the measurement device comprises a first stylus, a second stylus, and communication circuitry;
   establishing, by the device, a communication channel with the communication circuitry of the measurement device;
   receiving over the communication channel, by the device, a first set of measurements from the measurement device when the first stylus and the second stylus of the measurement device are in contact with the touch screen surface of the device and no object is located on a measurement surface of the measurement device, wherein the first set of measurements comprise a first measurement of pressure exerted on the touch screen surface by the first stylus and a second measurement of pressure exerted on the touch screen surface by the second stylus;
   receiving, by the device, the second set of measurements from the measurement device when the first stylus and the second stylus of the measurement device are in contact with the touch screen surface and an object is located on the measurement surface, wherein the second set of measurements comprises a third measurement of pressure exerted on the touch screen surface by the first stylus and a fourth measurement of pressure exerted on the touch screen surface by the second stylus;

subtracting the first measurement from the third measurement to obtain a first value representing a first change in pressure exerted on the touch screen surface by the object;

subtracting the second measurement from the fourth measurement to obtain a second value representing a second change in pressure exerted on the touch screen surface by the object;

determining, by the device, a weight of the object using the first value and the second value; and displaying the weight of the object on a display of the device.

2. The method of claim 1, further comprising:
initiating, by the touch screen device, an application in response to the measurement device contacting the touch screen; and
sending, by the touch screen device, the object weight to the application.

3. The method of claim 1, further comprising:
determining, by the touch screen device, a location where the first stylus or the second stylus contacts the touch screen; and
selecting, by the touch screen device, an application from a plurality of applications stored on the touch screen device based on the location of the contact.

4. A touch screen device comprising:
a touch screen;
a processing device operatively coupled to the touch screen, the processing device configured to:
receive a first set of measurements from a sensing component when a first stylus and a second stylus of the sensing component are in contact with a touch screen surface of the touch screen device and no object is located on a measurement surface of the sensing component, wherein the first set of measurements comprise a first measurement of pressure exerted on the touch screen surface by the first stylus and a second measurement of pressure exerted on the touch screen surface by the second stylus
receive, by the touch screen device, a second set of measurements from the sensing component when the first stylus and the second stylus of the sensing component are in contact with the touch screen surface and an object is located on the measurement surface, wherein the second set of measurements comprises a third measurement of pressure exerted on the touch screen surface by the first stylus and a fourth measurement of pressure exerted on the touch screen surface by the second stylus
subtract the first measurement from the third measurement to obtain a first change in pressure exerted on the touch screen surface by the object;
subtract the second measurement from the fourth measurement to obtain a second change in pressure exerted on the touch screen surface by the object; and
determine a weight of the object using the first change in pressure and the second change in pressure.

5. The touch screen device of claim 4, wherein the processing device is further configured to display the weight of the object.

6. The touch screen device of claim 4, wherein the processing device is further configured to:
invoke execution of an application in response to the sensing component contacting the touch screen; and
send the weight of the object to the application.

7. The touch screen device of claim 4, wherein the processing device is further configured to:
determine a location on the touch screen where at least a portion of the sensing component contacts the touch screen; and
select an application from a plurality of applications stored on the touch screen device based on the location of the contact.

8. The touch screen device of claim 6, wherein the application is a postage application or a cookbook application.

9. A non-transitory computer-readable storage medium storing instructions which, when executed, cause a touch screen device to perform operations comprising:
detecting, by a touch screen of the touch screen device, a presence of a sensing component placed on the touch screen;
receiving, by the touch screen device a first set of measurements from the sensing component when a first stylus and a second stylus of the sensing component are in contact with a touch screen surface of the touch screen device and no object is located on a measurement surface of the sensing component, wherein the first set of set of measurements comprise a first measurement of pressure exerted on the touch screen surface by the first stylus and a second measurement of pressure exerted on the touch screen surface by the second stylus;
receiving, by the touch screen device, a second set of measurements from the sensing component when the first stylus and the second stylus of the sensing component are in contact with the touch screen surface and an object is located on the measurement surface, wherein the second set of measurements comprises a third measurement of pressure exerted on the touch screen surface by the first stylus and a fourth measurement of pressure exerted on the touch screen surface by the second stylus
subtracting the first measurement from the third measurement to obtain a first change in pressure exerted on the touch screen surface by the object;
subtracting the second measurement from the fourth measurement to obtain a second change in pressure exerted on the touch screen surface by the object; and
determining a weight of the object using the first change in pressure and the second change pressure.

10. The non-transitory computer-readable storage medium of claim 9, wherein the operations further comprise displaying the weight of the object a display of the touch screen.

11. The non-transitory computer-readable storage medium of claim 9, wherein the operations further comprises:
invoking, by the touch screen device, execution of an application on the touch screen device in response to the sensing component being placed on the touch screen; and
sending, by the touch screen device, the object weight to the application.

12. The non-transitory computer-readable storage medium of claim 9, wherein the operations further comprise:
determining, by the touch screen device, a location on the touch screen where at least a portion of the sensing component contacts the touch screen; and
selecting an application from a plurality of applications stored on the touch screen device based on the location of the contact.

13. The non-transitory computer-readable storage medium of claim 12, wherein the application is a postage application or a cookbook application.

14. The non-transitory computer-readable storage medium of claim 9, wherein the operations further comprise determining when the first stylus or the second stylus presses against the touch screen when the sensing component is placed on the touch screen.

\* \* \* \* \*